(12) United States Patent
Dumoulin

(10) Patent No.: US 6,520,110 B2
(45) Date of Patent: Feb. 18, 2003

(54) INSTALLATION FOR THE SUGARCOATING OR ENCASING OF PRODUCTS WITH A DEVICE FOR CLEANING THE DISTRIBUTION OR PROPORTIONING MANIFOLD

(75) Inventor: Bernard Marcel Dumoulin, La Varenne (FR)

(73) Assignee: ETS. F. Dumoulin et Cie, Tourman en Brie (FR)

( * ) Notice: Subject to any disclaimer, the term of this patent is extended or adjusted under 35 U.S.C. 154(b) by 64 days.

(21) Appl. No.: 09/784,192

(22) Filed: Feb. 16, 2001

(65) Prior Publication Data
US 2001/0013314 A1 Aug. 16, 2001

(30) Foreign Application Priority Data
Feb. 16, 2000 (FR) .............................. 00 01878

(51) Int. Cl.[7] ................................. B05C 3/02
(52) U.S. Cl. ............................ 118/13; 118/17; 118/19; 118/31; 118/303; 118/418; 427/242; 427/425
(58) Field of Search ............................ 118/13, 17, 19, 118/31, 303, 418; 427/242, 425

(56) References Cited

U.S. PATENT DOCUMENTS

| | | | |
|---|---|---|---|
| 4,543,906 A | 10/1985 | Glatt et al. | .................. 118/19 |
| 4,596,205 A | 6/1986 | Dunajtschik | ................ 118/302 |
| 4,766,839 A | 8/1988 | Dunajtschik | ................. 118/19 |
| 4,844,001 A | 7/1989 | Jones | .......................... 118/24 |
| 5,441,565 A | 8/1995 | Velez | ........................... 118/24 |
| 5,495,418 A | 2/1996 | Latini et al. | .................. 118/20 |
| 5,589,225 A | * 12/1996 | Yamada et al. | ............... 118/17 |

FOREIGN PATENT DOCUMENTS

| | | |
|---|---|---|
| EP | 0 056 573 | 7/1982 |
| WO | WO 91/12789 | 9/1991 |
| WO | WO 95/19713 | 7/1995 |

* cited by examiner

*Primary Examiner*—Laura Edwards
(74) *Attorney, Agent, or Firm*—Young & Thompson

(57) ABSTRACT

The installation for sugarcoating or encasing of products by rotation of a cylindrical rotor includes a distribution and proportioning manifold mounted on support and guide rails external to the rotor permitting its total withdrawal from the rotor for the washing phase and its emplacement with no internal support within said rotor for the operating phase. The rails are formed by two horizontal beams, parallel to the axis of rotation of the rotor which is also the longitudinal axis of the manifold, fixed at one of their ends to the chassis of the rotor and at their other end to a transverse horizontal bar supported by at least one foot. At the level of one of its ends, the manifold is secured to a parallelepipedal frame which also supports closure means for the rotor and which slides along horizontal rails. Washing nozzles are disposed above the manifold at the level of the guide rails.

7 Claims, 6 Drawing Sheets

INSTALLATION FOR THE SUGARCOATING OR ENCASING OF PRODUCTS WITH A DEVICE FOR CLEANING THE DISTRIBUTION OR PROPORTIONING MANIFOLD

BACKGROUND OF THE INVENTION

The present invention relates to the field of installations and apparatus for the sugarcoating or encasing of products, and more precisely the cleaning of the distribution or proportioning manifolds for the encasing or sugarcoating substances.

DESCRIPTION OF THE INVENTION

Installations for sugarcoating or encasing, particularly for the food or pharmaceutical industry, use rotors of substantially cylindrical shape in which the products to be encased (for example almonds, peanuts, chewing gum, chocolate, etc . . . ) are moved by rotation of the cylinder.

During this rotation, alternate additions or products such as sugar syrup, liquid chocolate, various powders (for example sugar glazing, powdered sugar, starch, xylitol, maltitol, etc . . . ) followed by drying, are carried out according to the recipes for the different products.

So as to render the process automatic, the cylinders generally comprise in their central portion different systems for proportioning such as a manifold for the distribution and proportioning of the syrup, the chocolate, the powder and glazing products, as well as a supply sheath for air permitting blowing in drying air.

During the encasing step (sugarcoating) the products to be encased are placed in rotation and mixed, for example, by agitating blades fixed in the cylinder.

During the addition period, the encasing products (such as syrup, chocolate, . . . ) and the interiors (or lozenges) stick more or less to the mixing blades and on the walls of the cylinder, and then detach. Some of this thus sticks to the various systems in place in the cylinder. The same is true for all particles of sugar syrup, chocolate or powder which are pulverized on the lozenges.

After each production batch, it is necessary carefully to wash the interior of the cylinder, the distribution and proportioning manifold, the ventilating sheath and the agitating manes, for example by injection of water or a cleaning and/or disinfecting solvent. This can be carried out by washing nozzles disposed within the rotor, but act after each production. However, it has been seen that all the proportioning system cannot be correctly washed particularly in the case of chocolate or powder.

To overcome this serious present problem in a context of the production of foodstuffs and pharmaceuticals, certain materials comprise systems permitting to take off all or a portion of the proportioned materials on various types of supports, so as to carry out manual cleaning and maintenance of the system.

This remains a delicate and dirty operation which requires much time and specialized equipment.

It is moreover necessary to clean the internal support of the manifold which is for example in the form of an internal fixed slideway, to which the encasing products stick during rotation of the rotor.

SUMMARY OF THE INVENTION

The present invention therefore has for its object to overcome the problem of washing, by proposing an effective cleaning device, whilst seeking to limit the number of elements fixed within the cylindrical rotor.

The present invention also has for its object to provide a simple outlet system for the distribution and proportioning manifold to maintain and adjust the latter.

These objects are achieved by a sugarcoating or encasing installation for products, by rotation of a cylindrical rotor, comprising a distribution and proportioning manifold, mounted on support and guide rails outside the motor, permitting its total extraction from the rotor for the washing phase and its emplacement without any internal support within said rotor during the operating phase, characterized in that the rails are formed by two horizontal beams, parallel to the axis of rotation of the rotor, which is also the longitudinal axis of the manifold, fixed at one of their ends to the chassis of the rotor and at the other end to a transverse horizontal bar supported by at least one foot, in that at the level of one of its ends, the manifold is secured to a parallelepipedal frame, which also supports the closure means for the rotor and which slides along horizontal rails and in that washing nozzles are disposed above the manifold at the level of the guide rails.

Thanks to the position of the external support, the distribution and proportioning manifold for the encasing products is thus entirely extractable manually or automatically by a simple sliding on the axis of the rotor. Such a device makes unnecessary any support fixed within the cylinder, and hence considerably facilitates cleaning. In the washing position, the manifold is aligned with the axis of the rotor.

The supply passages for products, most often in liquid form, for encasing or sugarcoating, are preferably flexible conduits connected to said manifold.

Preferably, the device comprises an access platform, disposed below the manifold when withdrawn from the rotor, to carry out maintenance and/or adjustment of the proportioners.

The platform can support a retractable or telescopic washing basin, which, in the washing phase, is positioned so as to surround the assembly of the manifold and the ventilating sheath.

The washing nozzles can be supplied for example by pressurized water associated with one or several proportioning pumps permitting the injection of specific cleaning or disinfecting products.

The transverse horizontal bar at the end of the two horizontal portions is preferably supported by a single central vertical foot, thereby permitting activity around said manifold without hindering the personnel.

The installation according to the invention can be used for the sugarcoating or encasing of food products, pharmaceutical products or seeds.

BRIEF DESCRIPTION OF THE DRAWINGS

The invention will be described in greater detail with reference to the accompanying drawings, in which.

DESCRIPTION OF THE PREFERRED EMBODIMENTS

Figure 1:
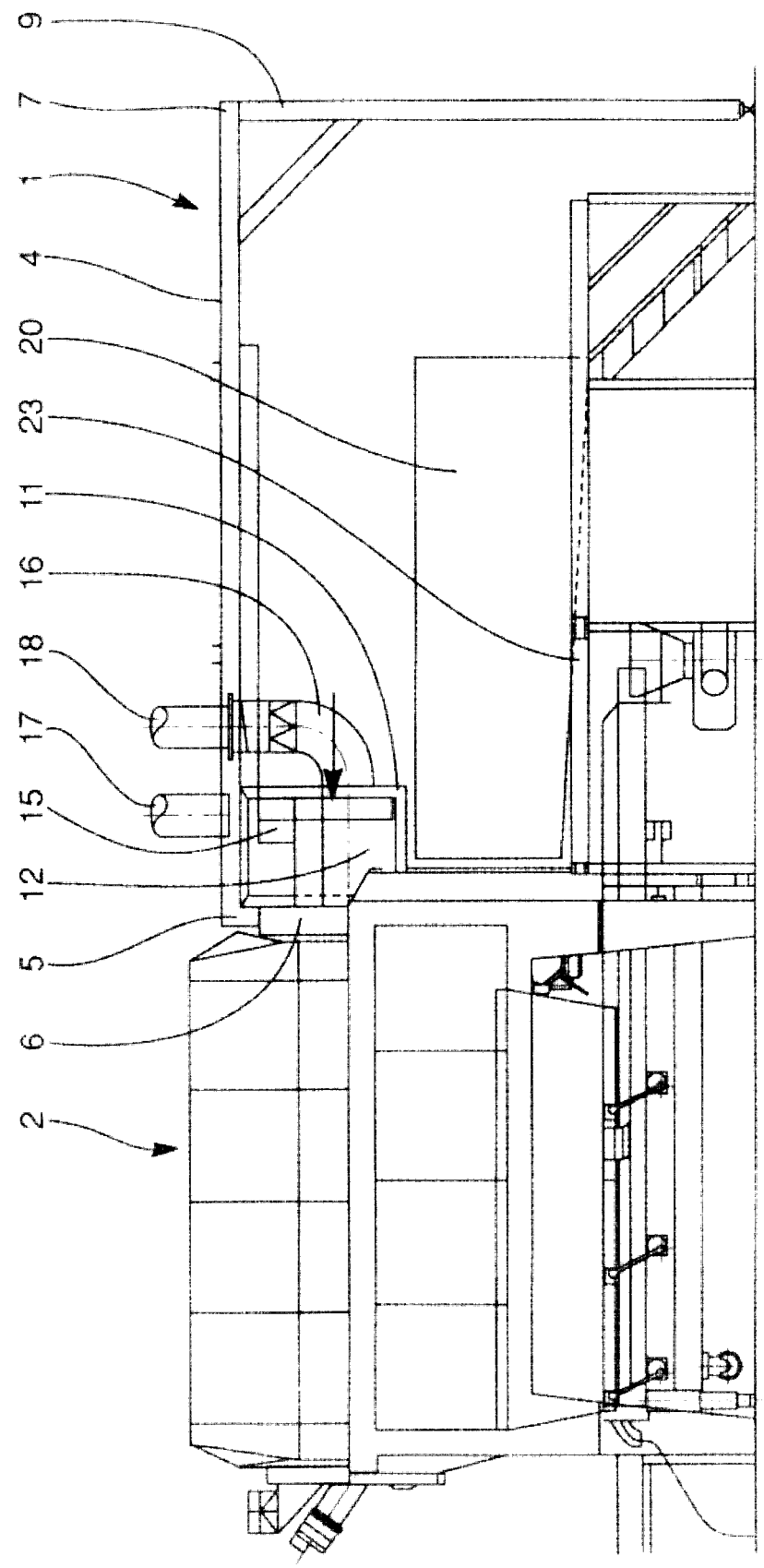
FIG. 1 is a longitudinal cross-sectional view of the device according to the invention when the distribution manifold is introduced into the rotor.
Figure 2:
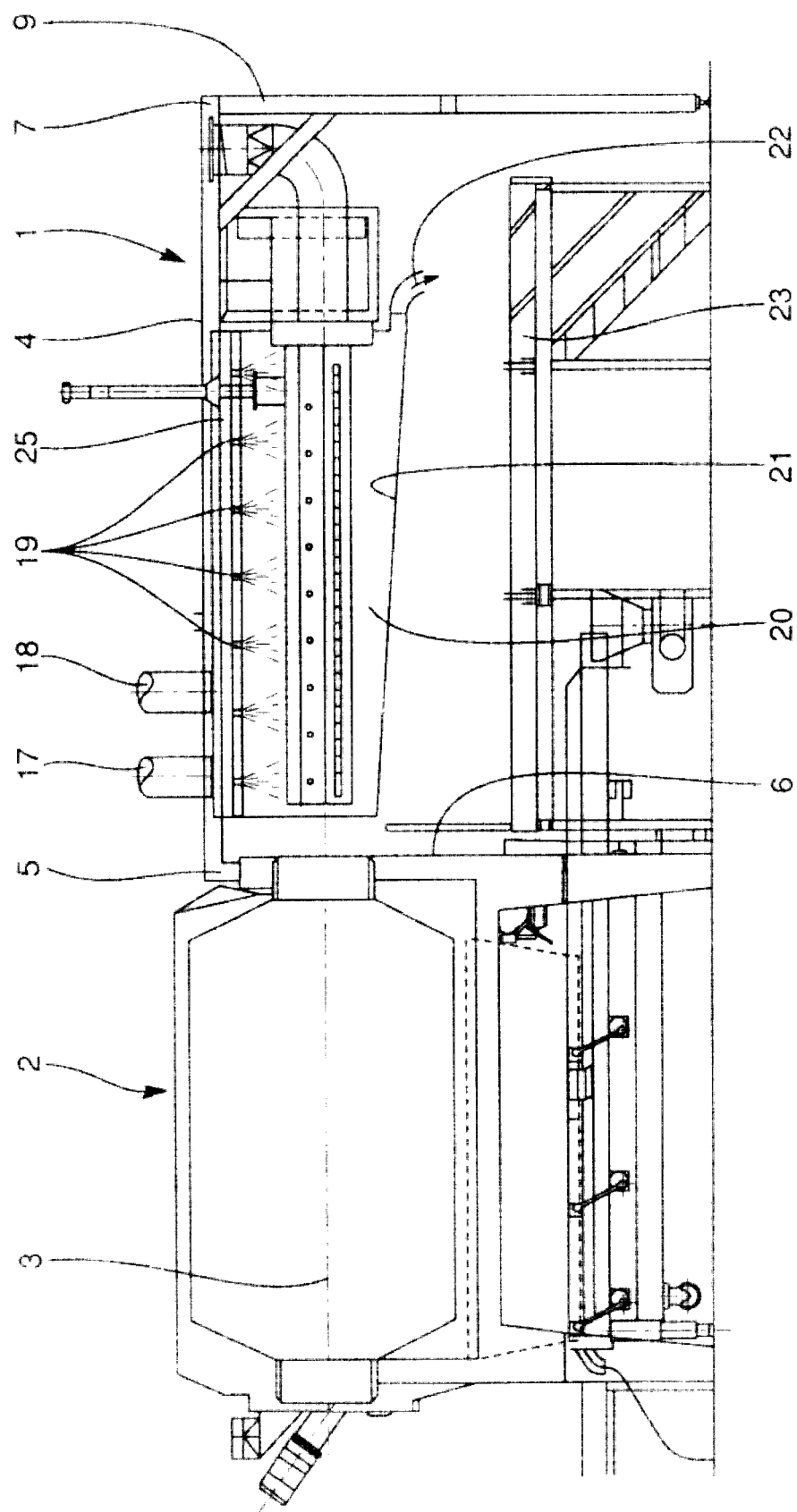
FIG. 2 is a longitudinal cross-sectional view of the device according to the invention when the distribution manifold is entirely withdrawn from the rotor.
Figure 3:
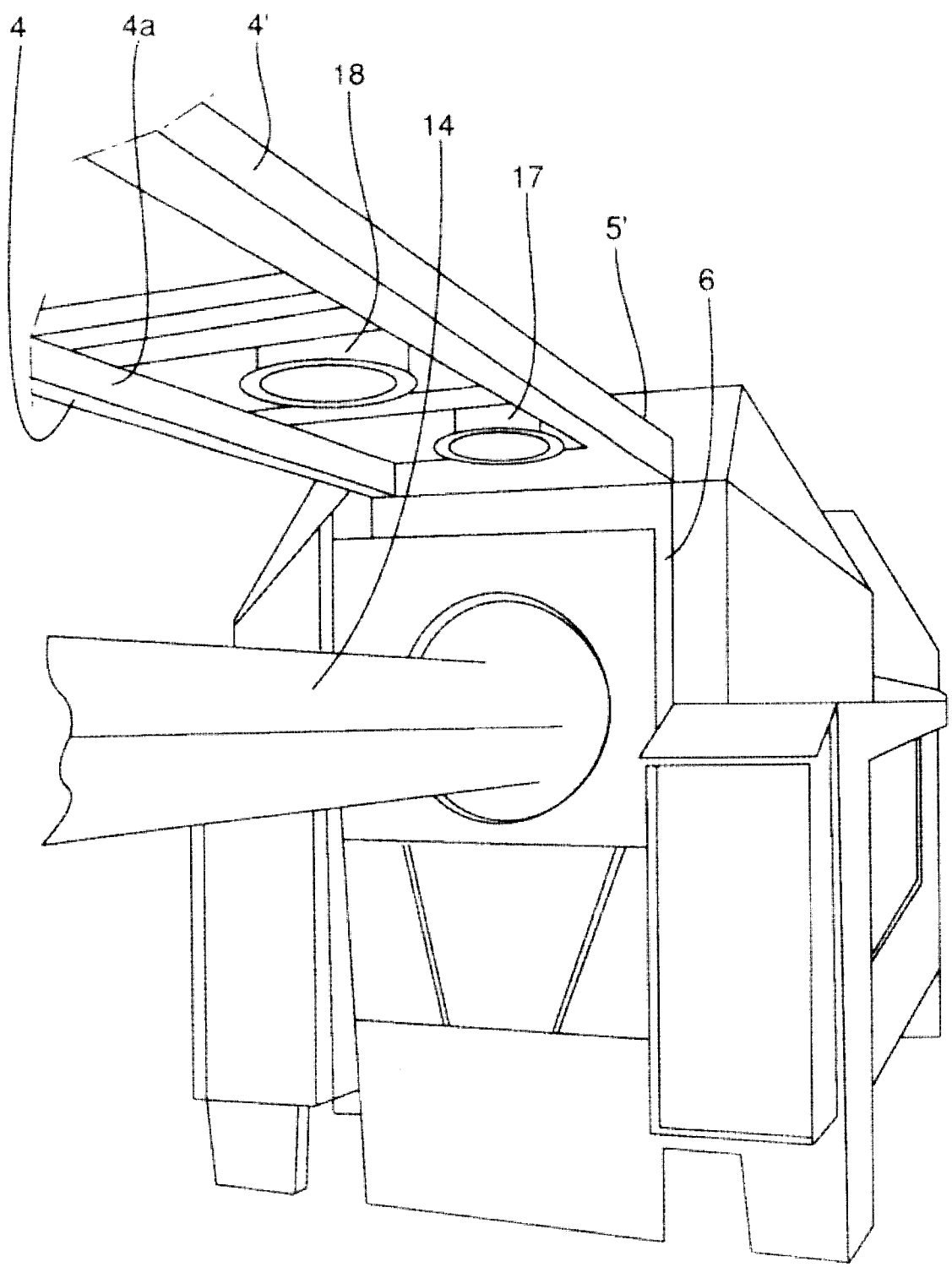
FIG. 3 is a perspective view of the front surface of the rotor with the manifold partially withdrawn.

In FIGS. 1 and 2 is shown all the cleaning device (1) associated with the rotor (2) of an installation for sugarcoating or encasing, rotating about the axis (3). This device comprises two horizontal beams (4, 4') parallel to the axis (3), which are fixed at one of their ends (5, 5') to the front surface of the chassis (6) of the rotor (2). These two beams (4, 4) are moreover fixed, at their ends (7, 7') opposite the rotor (2), to a transverse horizontal bar (8), supported by a foot (9).

Figure 4:
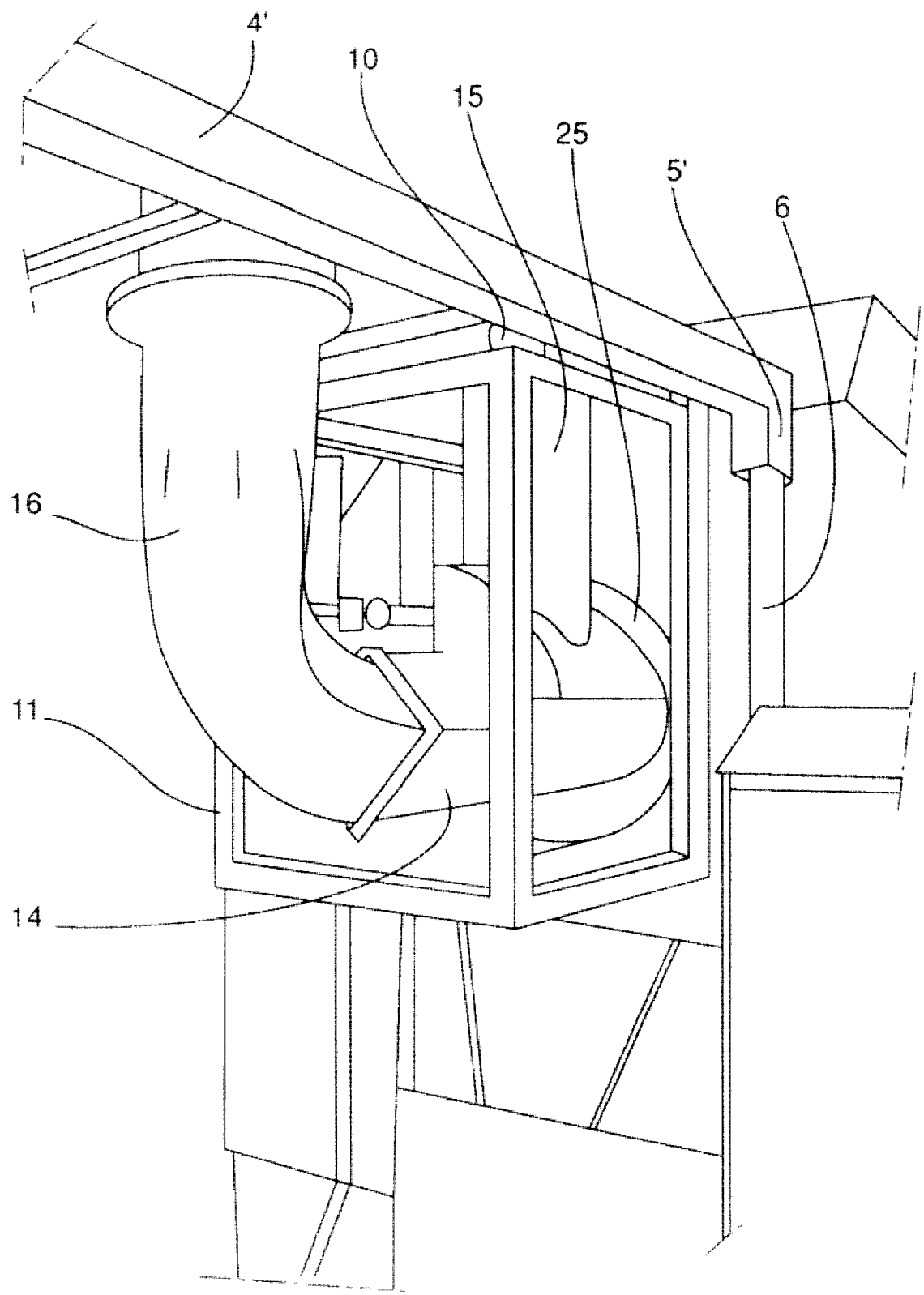
FIG. 4 is a perspective view of the front surface of the rotor with the manifold entirely introduced into the rotor.
Figure 5:
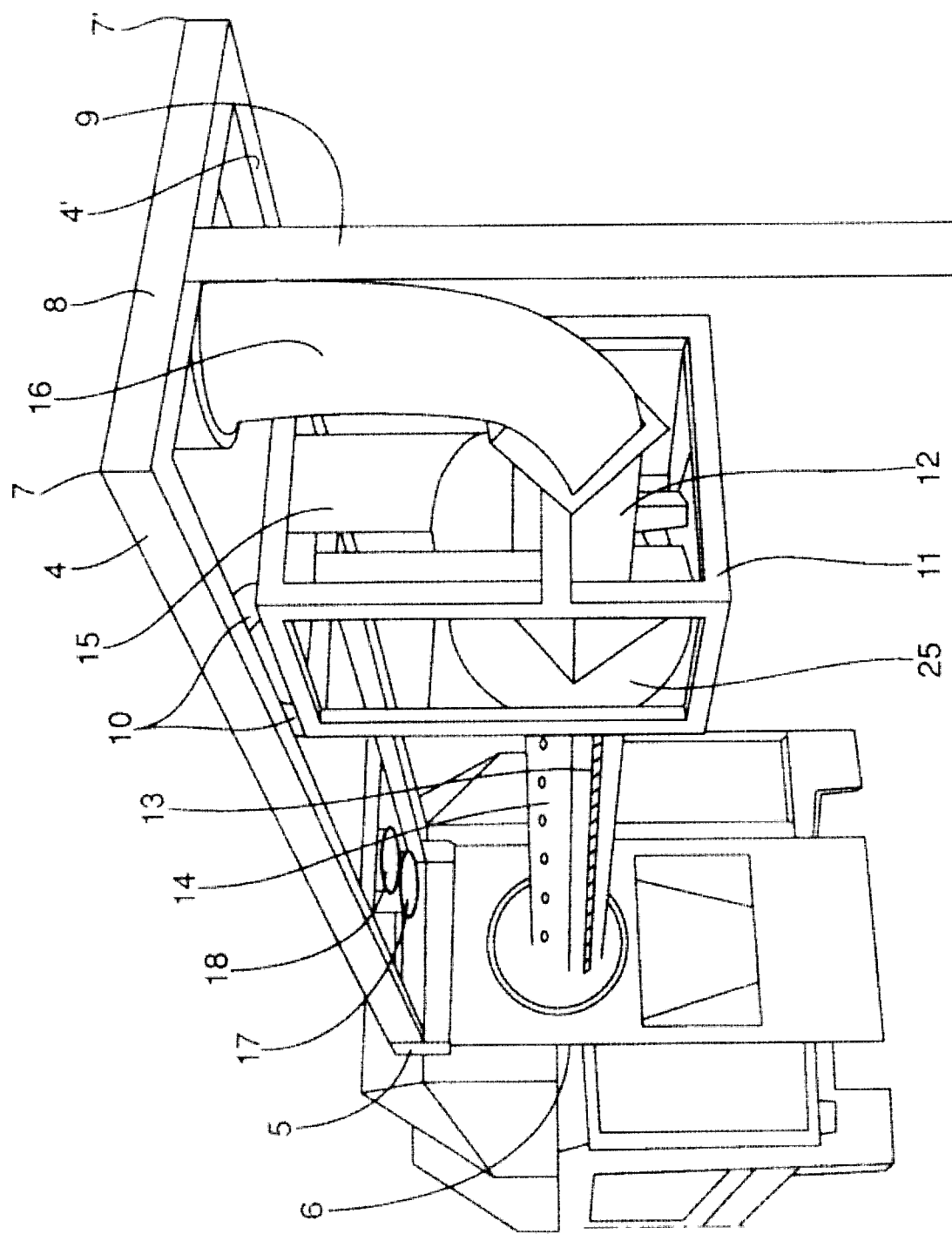
FIG. 5 is a perspective view of the front surface of the rotor with the assembly of the support device of the manifold partially withdrawn.
Figure 6:
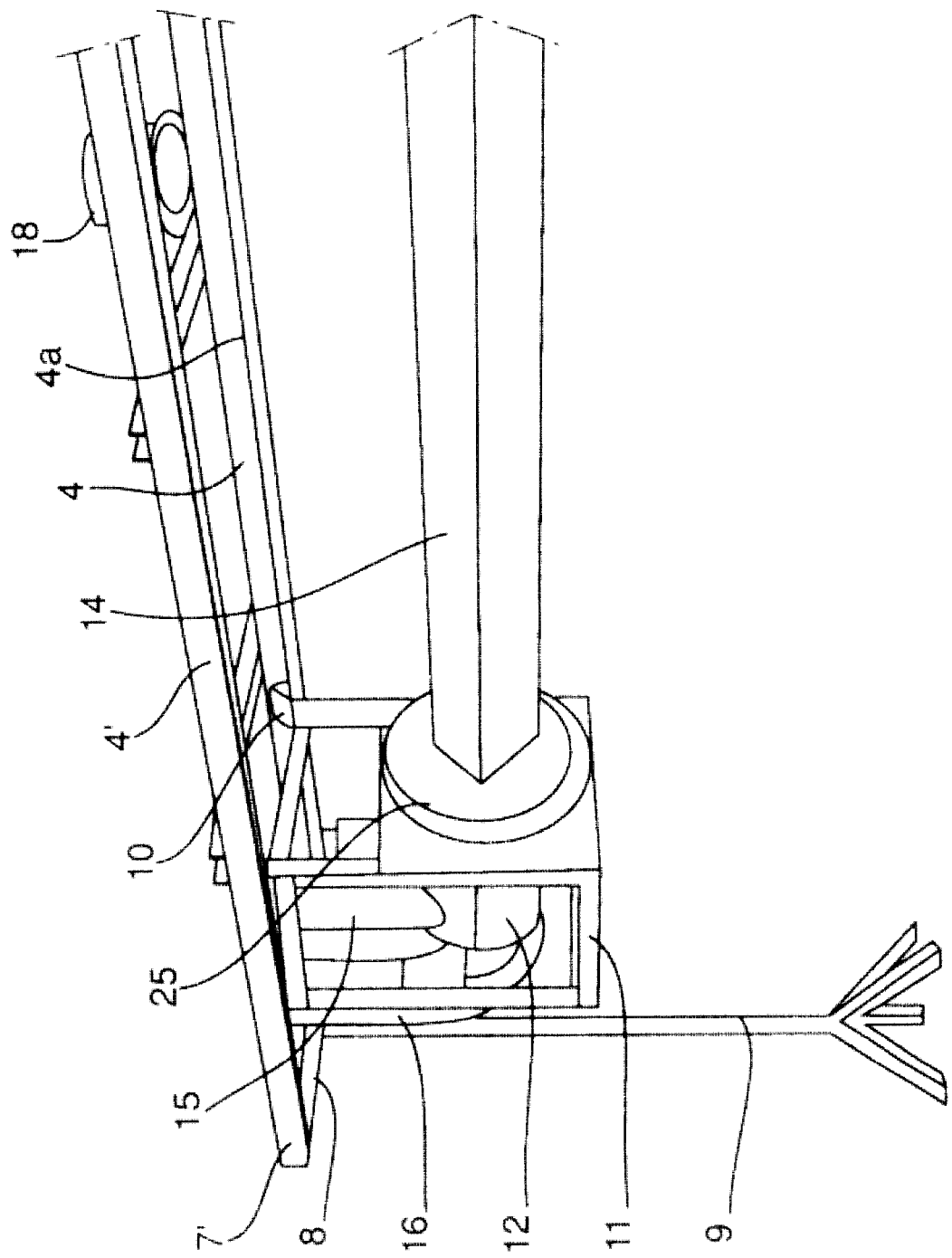
FIG. 6 is a perspective view of the support frame of the end of the manifold.

These beams form or are provided with rails (4a, 4a') on which slide upper runners (10) (visible in FIGS. 4 and 5) of a parallelepipedal frame (11) which supports the outer end (12) of the manifold for distribution and proportioning (13).

In operating position (1) the manifold (13) is entirely introduced into the cylindrical rotor (2), only its end (12) secured to the frame (11) extends outwardly, which thus supports the assembly of the manifold (13).

Such an arrangement thus permits freeing from any fixed internal support the distribution manifold (13) within the rotor (2).

The distribution and proportioning manifold (13) is associated with the ventilating sheath (14) which prolongs it at the level of the frame (11), with air supply and removal passages (15, 16) which connect it to respective inlet and outlet conduits (17, 18) fixed to the beams (4, 4'). The frame (11) also supports closure means (25) for the rotor (2).

When the cycle of sugarcoating or encasing is completed, the distribution and proportioning manifold (13) is withdrawn from the rotor (2) by sliding on the rails (4a, 4') for the washing phase. This withdrawal, which can be carried out manually or automatically, takes place along the axis (3) of the rotor (2).

The manifold (13) is then positioned below a row of washing nozzles (19) which project toward said manifold (13) water or another cleaning or disinfecting liquid, which is then recovered in a washing vat (20) enclosing all of the manifold (13) and ventilating sheath. This retractable washing vat (20) has an inclined bottom (21) provided at its lowermost part with a used washing liquid outlet which can be connected to a suitable system for processing waste water.

The washing nozzles (19), disposed in at least one row, are for example connected to a water pressurizer (not shown) which can be associated with one or several proportioning pumps (not shown) permitting the injection of specific cleaning or disinfecting products.

An access platform (23) disposed below the manifold (13) permits carrying out maintenance easily and adjusting the different proportioners/dispensers of the manifold when the latter is partially or totally withdrawn. The platform (23) is also a support for the washing vat (20) in retracted position.

The combination of the operations of withdrawal and cleaning of the manifold (13) can be carried out by the overall automatic control of the installation.

Such a cleaning device is of interest in installations for sugarcoating or encasing food products, pharmaceutical products or agro-foodstuffs of the seed type, particularly of large sizes.

What is claimed is:

1. Installation for sugarcoating or encasing products by rotation of a cylindrical rotor (2), comprising:

a distribution and proportioning manifold (13), mounted on support and guide rails (4a, 4a') outside the rotor (2) permitting its total withdrawal from the rotor (2) for the washing phase and its emplacement without any internal support within said rotor for the operating phase, wherein the rails (4a, 4a') are formed by two horizontal beams (4, 4') parallel to the axis (3) of rotation of the rotor which is also the longitudinal axis of the manifold (13), fixed at one of their ends (5, 5') to a chassis (6) of the rotor (2) and at their other end (7, 7') to a transverse horizontal bar (8) supported by at least one foot (9), and in that at the level of one of its ends, the manifold (13) is secured to a parallelepipedal frame (11), which frame (11) also supports a closure means (25) of the rotor (2) and which frame (11) slides along the horizontal beams (4a, 4a'), and washing nozzles (19) are disposed above the manifold (13) at the level of the guide beams (4a, 4a').

2. Installation according to claim 1, wherein the distribution or proportioning manifold (13) is associated with a ventilating sheath (14) whose air supply and removal passages (15, 16) are also secured to said frame (11).

3. Installation according to claim 1, wherein supply passages for the encasing or sugarcoating product are flexible tubes connected to said manifold (13).

4. Installation according to claim 1, further comprising an access platform (23), disposed below the manifold (13) when withdrawn from the rotor (2), to carry out maintenance and/or adjustment of proportioners.

5. Installation according to claim 4, wherein the platform (23) supports a retractable washing vat (20) which, in the washing phase, is positioned so as to enclose an assembly of the manifold (13) and a ventilating sheath (14).

6. Installation according to claim 1, wherein the washing nozzles (19) are supplied by high pressure water associated with one or several proportioning pumps permitting the injection of specific cleaning or disinfecting products.

7. A method of sugarcoating or encasing of food products, pharmaceutical products or seeds, comprising the step of sugarcoating or encasing the products or seeds by rotation of a cylindrical rotor (2) comprising a distribution and proportioning manifold (13), mounted on support and guide rails (4a, 4a') outside the rotor (2) permitting its total withdrawal from the rotor (2) for the washing phase and its emplacement without any internal support within said rotor for the operating phase, wherein the rails (4a, 4a') are formed by two horizontal beams (4, 4') parallel to the axis (3) of rotation of the rotor which is also the longitudinal axis of the manifold (13), fixed at one of their ends (5, 5') to a chassis (6) of the rotor (2) and at their other end (7, 7') to a transverse horizontal bar (8) supported by at least one foot (9), and in that at the level of one of its ends, the manifold (13) is secured to a parallelepipedal frame (11), which frame (11) also supports a closure means (25) of the rotor (2) and which frame (11) slides along the horizontal beams (4a, 4a'), and washing nozzles (19) are disposed above the manifold (13) at the level of the guide beams (4a, 4a').

\* \* \* \* \*